D. D. Robinson,
Bolt Cutter.

Nº 55,366.      Patented June 5, 1866.

Witnesses:      Inventor:

UNITED STATES PATENT OFFICE.

D. D. ROBINSON, OF NILES, MICHIGAN.

IMPROVEMENT IN RIVET OR BOLT CUTTERS.

Specification forming part of Letters Patent No. 55,366, dated June 5, 1866.

*To all whom it may concern:*

Be it known that I, D. D. ROBINSON, of Niles, Berrien county, State of Michigan, have invented a new and useful Improvement in Machines for Cutting off Bolts, &c.; and I do hereby declare that the following is a full, clear, and exact description thereof, which will enable others skilled in the art to make and use the same, reference being had to the accompanying drawings, forming part of this specification, in which—

Figure 1:
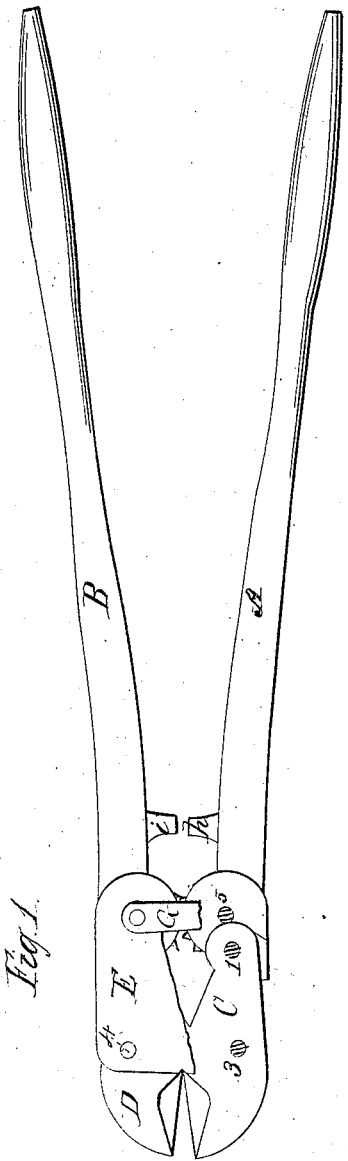
Figure 3:
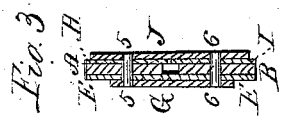
Figure 2:
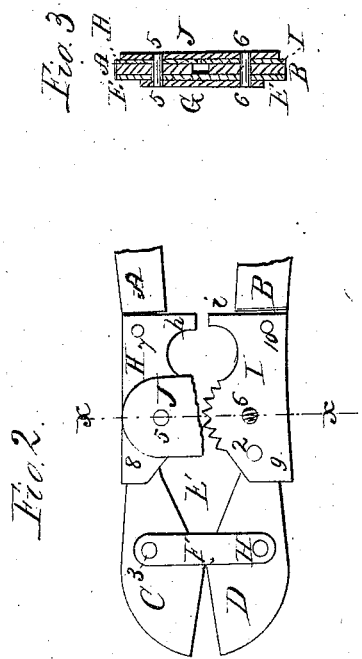

Figure 1 is a view of one side of my improved machine, a part of the covering-plate being broken away to show the construction. Fig. 2 is a view of a portion of the other side of the same, a part of the covering-plate being removed to show the construction. Fig. 3 is a cross-section of the same, taken through the line *x x*, Fig. 2.

Similar letters of reference indicate like parts.

My invention has for its object to furnish a machine by means of which bolts or rivets may be cut off to a proper length, and by means of which sheet and bar metal may be cut as desired; and it consists, first, in a cutting-machine formed by combining and arranging the eccentric levers, jaws, and plates with each other; and, second, in the combination of the toothed and stop plates with the eccentric-levers, for the purpose of causing the levers and jaws to move equally, the parts being constructed and arranged as hereinafter more fully described.

A and B are the eccentric-levers, the long arms of which form the handles of the machine. The short arms of these levers are enlarged and rounded off, and in their ends are formed circular recesses for the reception of the rounded ends of the jaws C and D, as shown in Fig. 1. The ends of the levers A and B are pivoted to the ends of the jaws C and D by the rivets 1 and 2.

E is a plate, to which each of the jaws C and D and each of the levers A and B are pivoted by the rivets 3, 4, 5, and 6; but I prefer to replace these four rivets with bolts, so that the machine may be taken apart when desired or when necessary for repairing any of the parts.

On the side of the jaws C and D, opposite the plate E, is a bar or plate, F, held by the rivets 3 and 4, for the purpose of giving strength to the connection between the jaws C and D.

The holes through the plate E through which the rivets 5 and 6 pass are slightly slotted to accommodate the eccentric pivoting of the levers A and B.

To furnish a firm support for the heads of the said rivets, and at the same time to keep the ends of the levers in the same position with respect to each other while operating, a bar or plate, G, is applied to the side of the machine, through which the said rivets or bolts pass and to which they are secured.

H and I are plates made in the form shown in Fig. 2, and secured to the ends of the levers A and B by the rivets 7 8 9 10. The rounded parts of the plates H and I that come in contact with each other are toothed, so as to cause the levers A and B, and consequently the jaws C and D, to move equally. The projecting parts *h* and *i* of these plates are stops, which come together when the jaws are closed and prevent the said jaws from cutting upon each other. But instead of making the plates H and I separate and riveting them to the eccentric levers A and B, I prefer to make the said parts H and I a solid part of the said levers, as being an easier and better construction.

J is a plate applied to the side of the machine, through which the rivets or bolts 5 and 6 pass and to which they are secured, to strengthen the connection between the levers A and B and assist in keeping them in the same position with respect to each other while operating.

This instrument can be used for cutting off any bolts or rivets or for cutting any kind of flat metal, but it is intended more especially for trimming carriage and wagon bolts.

I claim as new and desire to secure by Letters Patent—

1. An improved machine for cutting off bolts or rivets, formed by combining and arranging the eccentric-levers A B, the jaws C D, and plates E F G J with each other, substantially as described, and for the purpose set forth.

2. The combination of the toothed and stop plates H I with the eccentric-levers A and B, substantially as described, and for the purpose set forth.

D. D. ROBINSON.

Witnesses:
H. A. CHAPIN,
I. W. EGBERT.